United States Patent [19]

Newman

[11] Patent Number: 4,462,668

[45] Date of Patent: Jul. 31, 1984

[54] HOLOGRAM APPARATUS FOR DETECTING FLAWS WITH DEVELOPING CHAMBER

[75] Inventor: John W. Newman, Wayne, Pa.

[73] Assignee: Laser Technology, Inc., Norristown, Pa.

[21] Appl. No.: 284,634

[22] Filed: Jul. 20, 1981

Related U.S. Application Data

[63] Continuation-in-part of Ser. No. 194,343, Oct. 6, 1980, abandoned.

[51] Int. Cl.³ .......................... G03D 3/02; G03D 3/08
[52] U.S. Cl. ..................................... 354/317; 354/324
[58] Field of Search ................. 354/317, 323, 324, 78, 354/83

[56] References Cited

U.S. PATENT DOCUMENTS

| | | | |
|---|---|---|---|
| 2,780,974 | 2/1957 | Fairbank | 354/317 |
| 2,981,170 | 4/1961 | Brault | 354/317 |
| 3,200,724 | 8/1965 | Stamm et al. | 354/78 |
| 3,739,702 | 6/1973 | Wender et al. | 354/83 |
| 3,886,576 | 5/1975 | Stoffel | 354/317 |
| 3,936,854 | 2/1976 | Smith | 354/323 |

FOREIGN PATENT DOCUMENTS

| | | |
|---|---|---|
| 642465 | 9/1950 | United Kingdom . |
| 1040620 | 9/1966 | United Kingdom . |
| 1412973 | 9/1975 | United Kingdom . |
| 1501298 | 2/1978 | United Kingdom . |
| 2035586A | 6/1980 | United Kingdom . |
| 1582645 | 1/1981 | United Kingdom . |

Primary Examiner—A. A. Mathews
Attorney, Agent, or Firm—John F. A. Earley

[57] ABSTRACT

Hologram apparatus for detecting flaws has a photographic station for supporting a photosensitive medium. The photographic station together with the photosensitive medium forms a developing chamber with a transparent face having a depth in the range of from about 0.005" to about 0.125", preferably from about 0.005" to about 0.125". The developing chamber has a periphery with a contour which always changes at an angle greater than about 115° and is preferably circular. Associated hydraulic equipment supplies and removes fluid from the developing chamber. A laser supplies coherent light for the article to be tested for reflection to the photographic station. A reference beam is directed to the photographic station. For use in inspecting pipe in the field, the apparatus advantageously has a housing and a pair of saddles each having different diameter pipe receiving portions and a strap securing system. The photographic station can develop the photosensitive medium in situ and may be used in any spatial orientation. The invention also comprises the photographic station per se without the laser.

5 Claims, 17 Drawing Figures

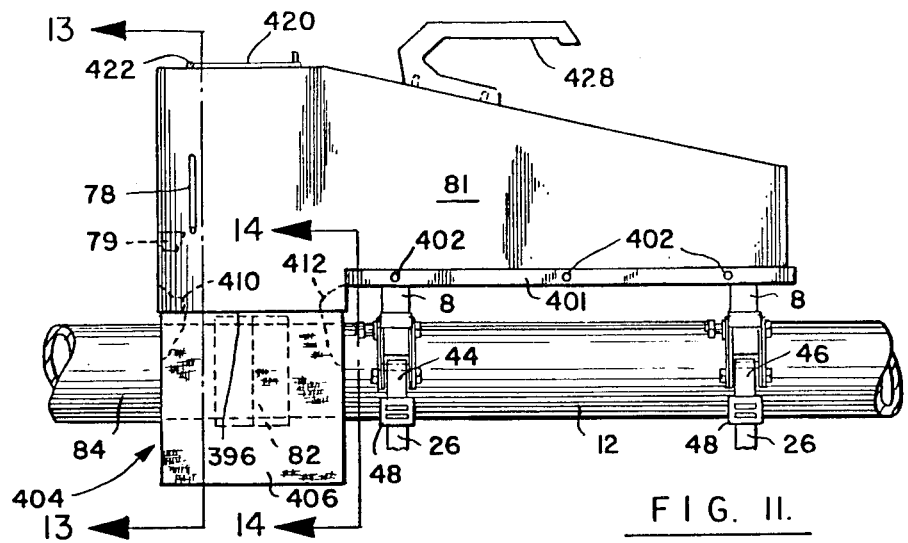
FIG. 11.
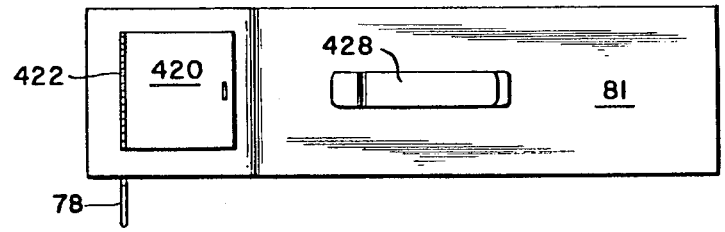
FIG. 12.
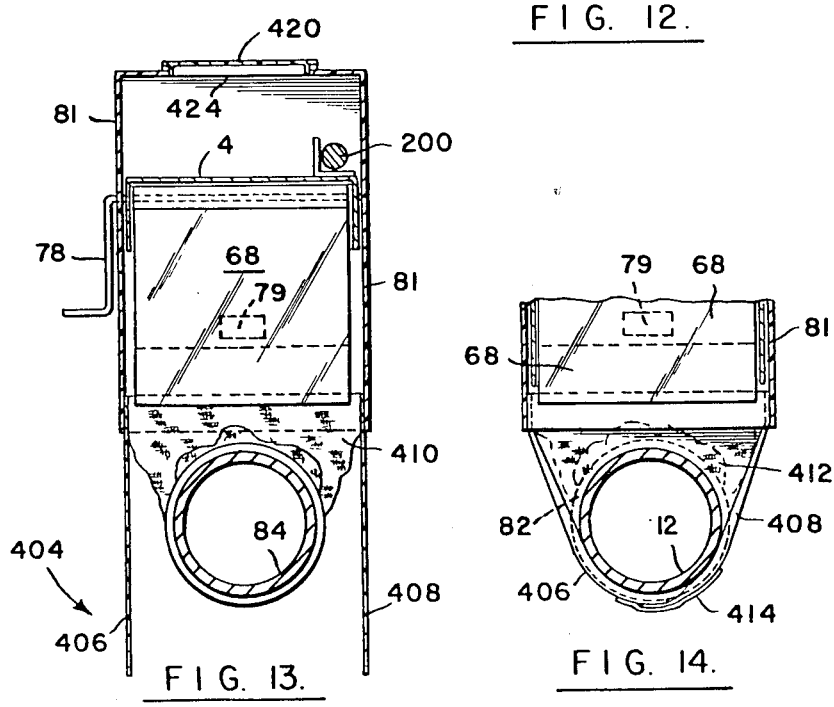
FIG. 13.
FIG. 14.

a
HOLOGRAM APPARATUS FOR DETECTING FLAWS WITH DEVELOPING CHAMBER

CROSS REFERENCE

This invention is a continuation-in-part of application Ser. No. 194,343 filed Oct. 6, 1980, now abandoned.

TECHNICAL FIELD

This invention is in the field of non-destructive testing.

BACKGROUND OF THE PRIOR ART

It is well known to use interferometric holography in non-destructive testing. It is also known to develop a photographic film used in such testing in situ in order to expedite the testing procedure. Reference may be had to U.S. Pat. No. 3,739,702 which is incorporated herein by reference. This patent discloses water in the developing chamber during the imaging of the film. The in situ development of film in apparatus for exposing and developing film and projecting the image of the developed film is disclosed in U.S. Pat. No. 3,200,724 which is incorporated herein by reference. In this patent water is used in the developing chamber to improve the transmission of light through the film holding device and to eliminate the drying of the film after development and prior to protection.

BRIEF SUMMARY OF THE INVENTION

This invention provides hologram apparatus of great flexability and convenience for use in double exposure and real time holographic interferometry. It incorporates a superior film handling and developing structure. It overcomes a serious problem inherent in the prior art in that it can be used in any spatial orientation.

In accordance with the invention, hologram apparatus for detecting flaws has a photographic station for supporting a photosensitive medium. The photographic station together with the photosensitive medium forms a developing chamber with a transparent face having a depth in the range of from about 0.005" to about 0.125", preferably of from about 0.005" to about 0.080". The developing chamber has a periphery with a contour which always changes at an angle greater than about 115°, advantageously greater than 125°, and is preferably circular. Associated hydraulic equipment supplies and removes fluid from the developing chamber. A laser supplies coherent light for the article to be tested for reflection to the photographic station. A reference beam is directed to the photographic station. For use in inspecting pipe in the field, the apparatus advantageously has a housing and a pair of saddles each having different diameter pipe receiving portions and a strap securing system. The photographic station can develop the photosensitive medium in situ and may be used in any spatial orientation. The invention also comprises the photographic station per se without the laser.

Due to the construction of the developing chamber, capillary action causes a liquid entering it to force out all fluid already in the chamber irrespective of spatial orientation. This insures that there is no premature film development by the presence of a residual amount of processing liquid and that the developing liquid is not diluted by the flushing liquid at any point in the chamber. The contour of the developing chamber periphery insures that adhesion between the chamber and a contained liquid will not result in a pocket of liquid being retained in the chamber when it is desired to evacuate it. The developing chamber minimizes the amount of developing liquid required for processing.

BRIEF DESCRIPTION OF THE DRAWINGS

FIG. 11 is a front elevation of the apparatus of FIG. 1 with the housing in place;

FIG. 12 is a plan view of the apparatus as shown in FIG. 11;

FIG. 13 is a section taken on the plane indicated by the line 13—13 in FIg. 11;

FIG. 14 is a section partially broken away on the plane indicated by the line 14—14 in FIG. 11;

DETAILED DESCRIPTION

Figure 2:
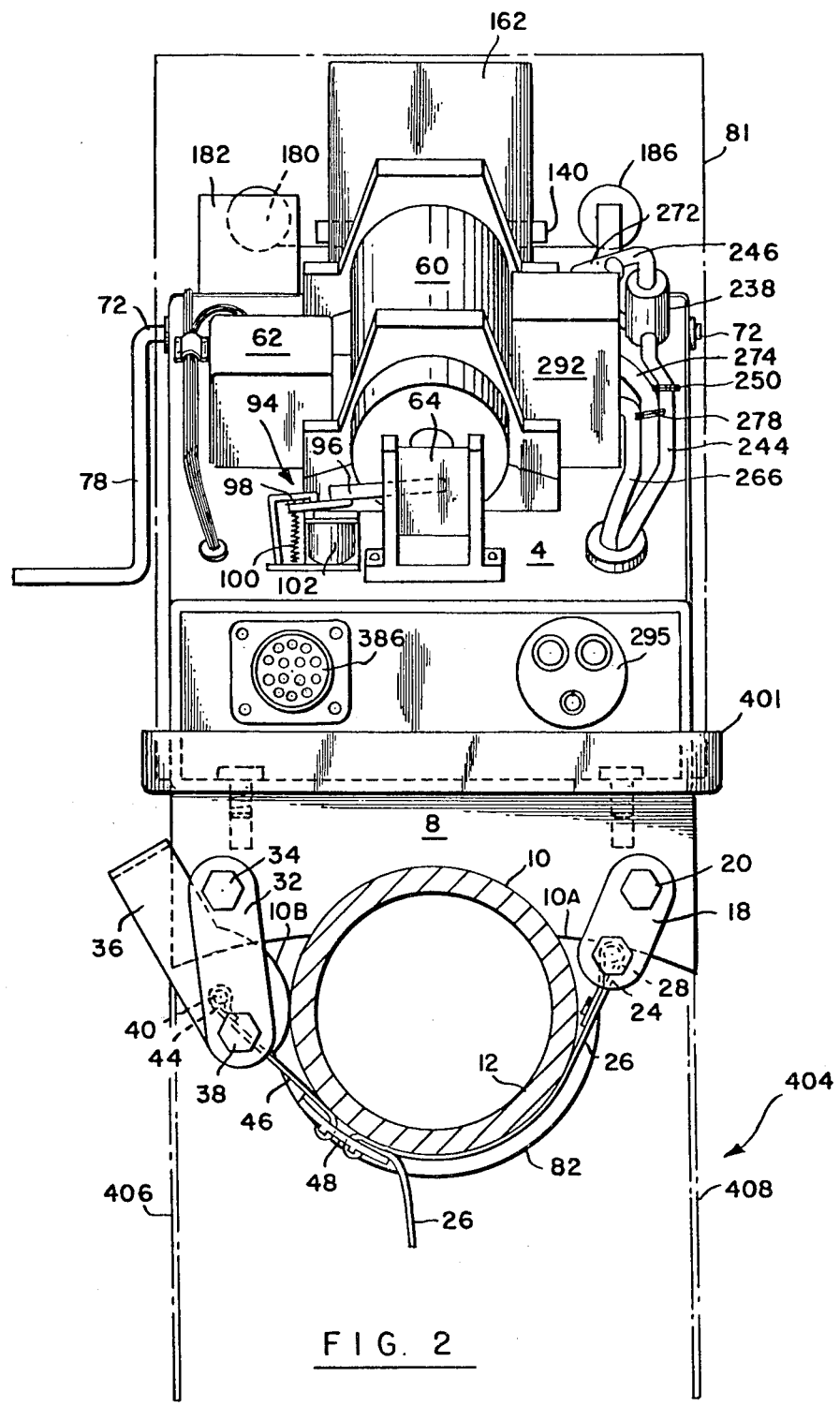
FIG. 2 is a righthand elevation of the apparatus of FIG. 1 without the housing.
Figure 3:
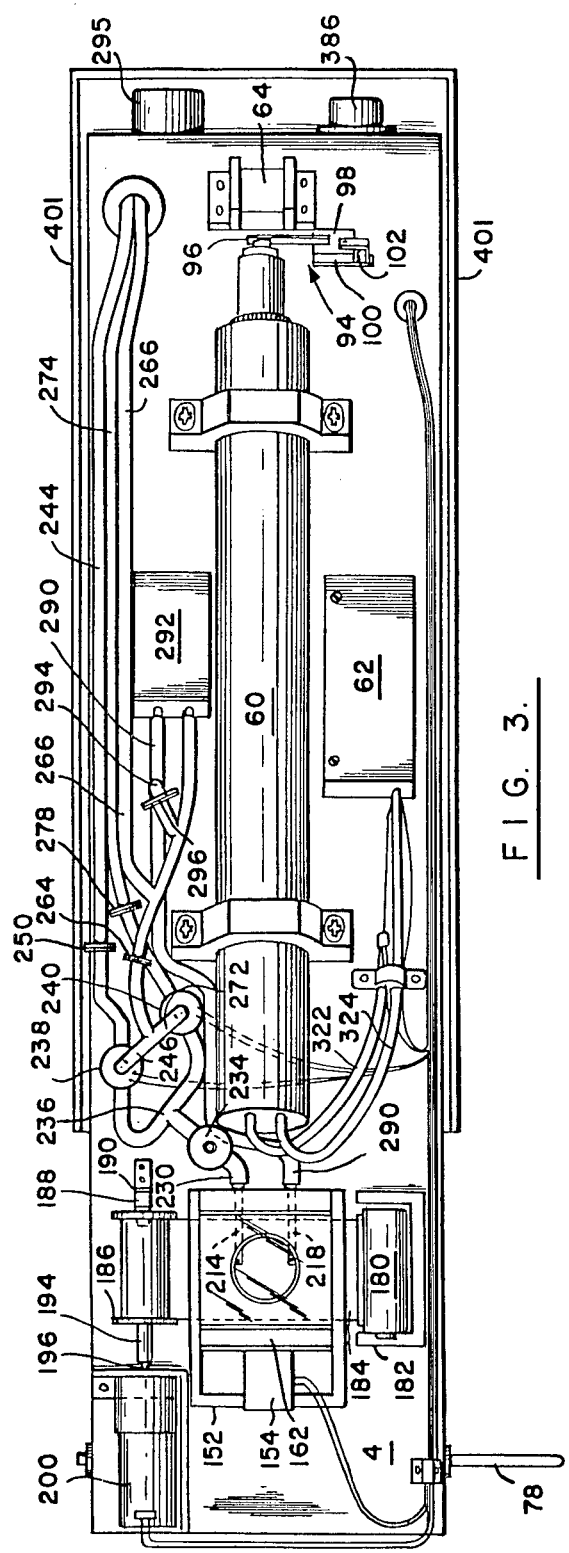
FIG. 3 is a plan view of the apparatus of FIG. 1 without the housing.
Figure 5:
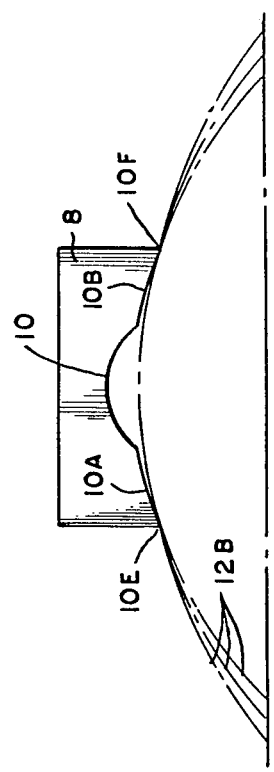
FIG. 5 is a view illustrating the use of one of the securing saddles.
Figure 4:
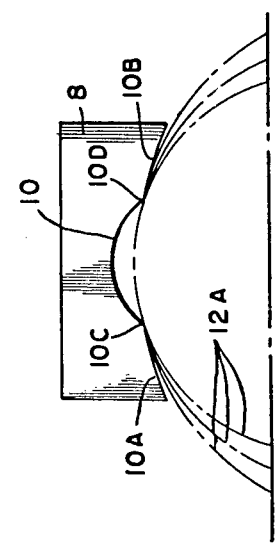
FIG. 4 is a view illustrating the use of one of the securing saddles.
Figure 6:
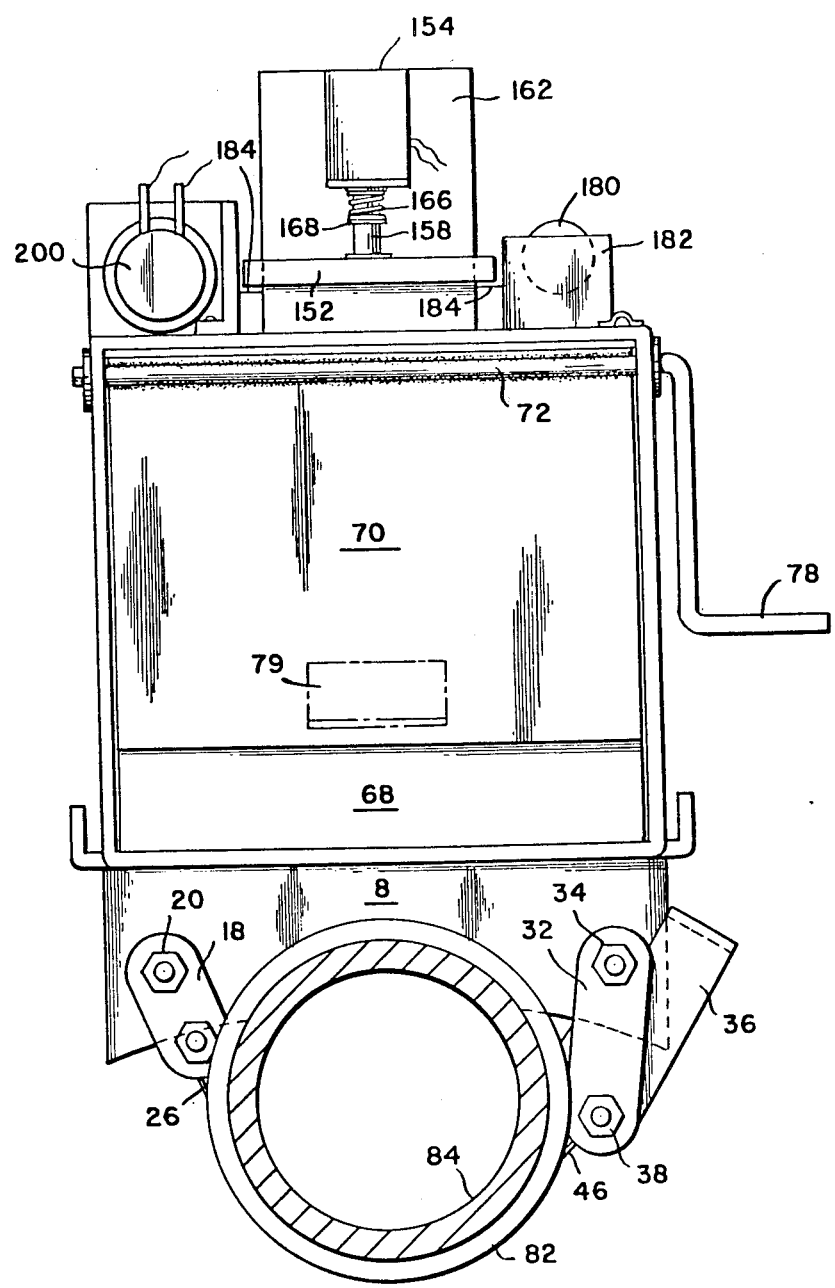
FIG. 6 is a lefthand elevational view of the apparatus of FIG. 1 without the housing.

Hologram apparatus 2 in accordance with the invention has a frame 4 to which is secured a pair of saddles 8, 8 each having an arcuate recess 10 adapted to receive a pipe 12 (FIG. 2). Each saddle 8 also has a pair of recess portions 10A and 10B on an arc of much greater radius than the radius of recess 10 to accommodate large diameter pipes. In FIG. 4 broken lines 12A represent pipes of varying diameters bearing on saddles 8 at points 10C and 10D. For larger pipe a greater span of bearing is achieved as is illustrated in FIG. 5 where broken lines 12B represent larger diameter pipes bearing on saddles 8 at 10E and 10F, the wider span giving a more stable support for the saddle 8 and apparatus 2. Pipes of the size of pipe 12 and smaller are accommodated in recess 10 of each saddle 8.

Each saddle 8 has a yoke 18 secured thereto pivotally as indicated at 20. One end 24 of a strap 26 is secured to yoke 18 as indicated at 28. A second yoke 32 is pivotally secured thereto at 34. A yoke 36 having a pin 40 is pivotally secured to lever 32. One end 44 of a second strap 46 is secured to pin 40. A conventional adjustable buckle 48 removably connects straps 26 and 46.

Figure 1:
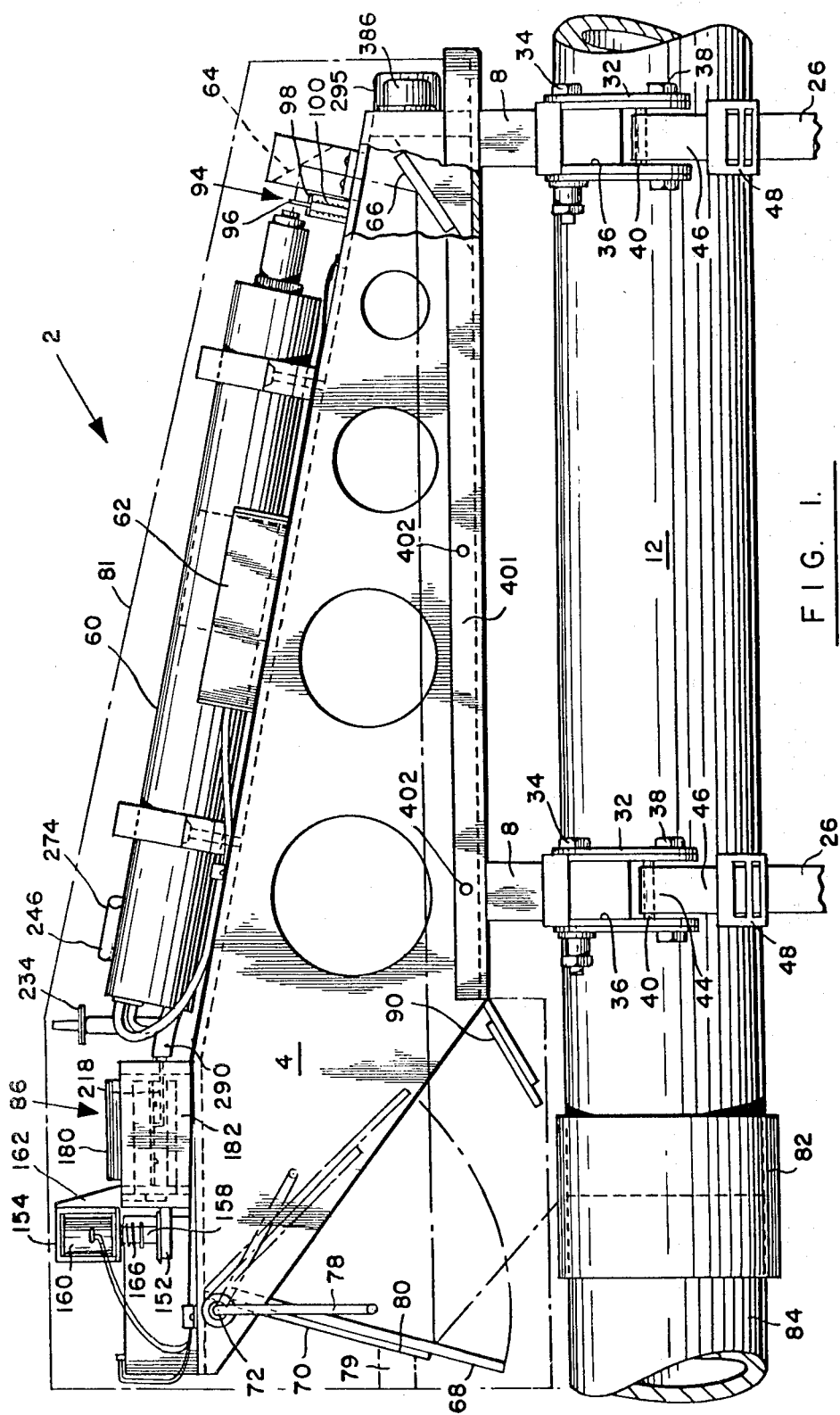
FIG. 1 is a front elevation of the hologram apparatus of the invention without the housing.

A laser 60 is secured to frame 4 and is connected to a power supply indicated at 62 (FIG. 1). Laser 60 may be, for example, a helium-neon laser having an output of ten miliwatts. Any laser known to the prior art for holographic non-destructive testing such as a YAG laser, a krypton laser, a $CO_2$ laser or a nitrogen laser may be used. A continuous wave laser operating in the $TEM_{00}$ mode should be used. Advantageously, the laser will have a power output from about 1 to about 20 miliwatts.

The beam from laser 60 is directed to mirror indicated at 64 (FIG. 1) which directs the beam downwardly to a mirror 66 which directs the beam to mirror 68 secured to a metal plate 70 which in turn is secured to a rod 72 pivotally mounted transversely on frame 4. A handle 78 integral with rod 72 is used for pivoting of mirror 68. A magnet 79 having a chamfered face 80 and attached to housing 81 shown in FIG. 1 in phantom holds plate 70 and mirror 68 in position shown in FIG. 1. In this position mirror 68 reflects the laser beam downwardly to a pipe coupling 82 coupling pipe 12 to a pipe 84. A portion of the laser beam is reflected from coupling 82 upwardly to a photographic station 86. A portion of the laser beam is reflected from mirror 68 to a reference beam mirror 90 and thence to photographic station 86.

The laser beam is controlled by a shutter 94 having an arm 96 (FIG. 2) adapted to block the light emanating from the laser. Arm 96 is secured to a pivot plate 98 (FIG. 2) biased to the shutter closed position by an extension spring 100. Pivot plate 98 is actuated by a solenoid 102 which when actuated opens the shutter 94 to permit the passage of light from the laser to mirror 64.

Figure 7:
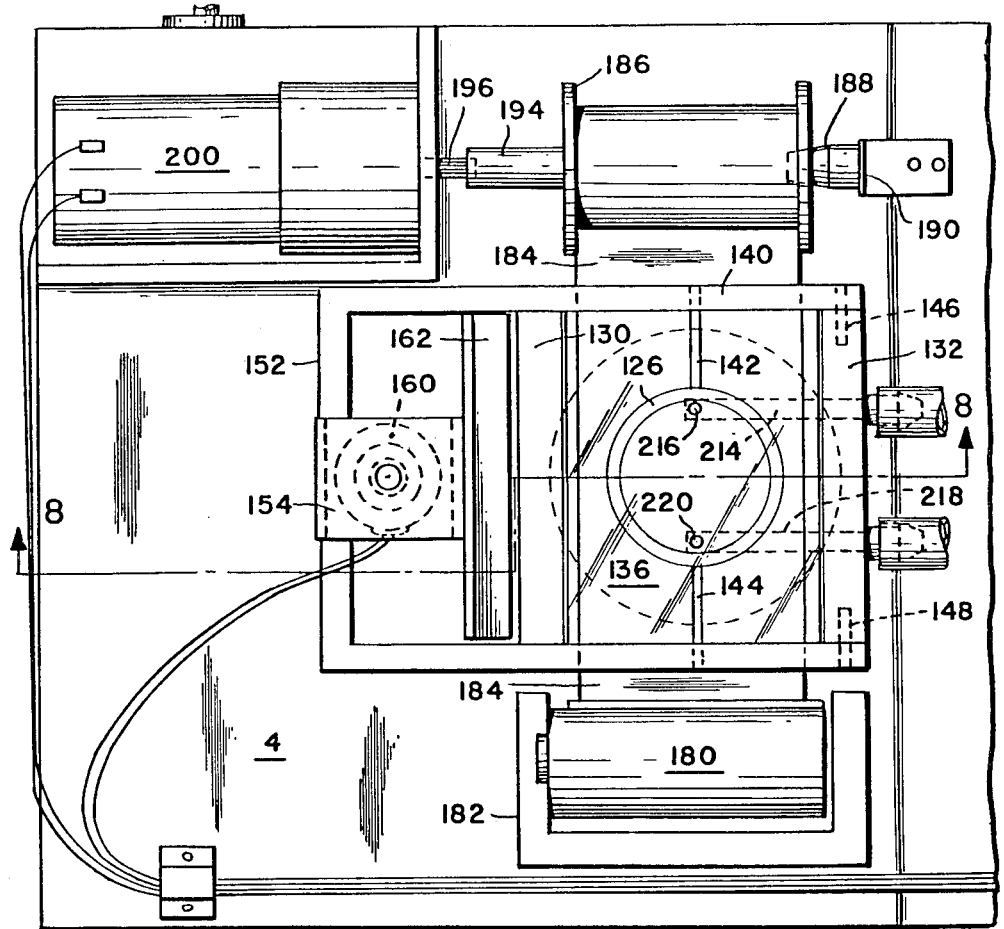
FIG. 7 is an enlarged plan view of the photographic station.

Photographic station 86 has a transparent plate 120 (FIG. 8) of, for example, a synthetic resin such as an acrylic, polycarbonate, fluoro or polystyrene resin. Plate 120 is secured to frame 4 over an opening 122 in frame 4. A circular groove 124 contains a ring gasket 126 of for example rubber which is circular in cross-section and extends slightly above the top 128 of plate 120. A pair of bars 130 and 132 are secured by an adhesive to the top 128 of plate 120. A transparent plate 136 of, for example, a synthetic resin such as one of those listed above, overlies plate 120 between bars 130 and 132 and is pivotally secured to a yoke frame 140 by pins 142, 144 (FIG. 7). Yoke 140 is pivotally secured to block 132 by pins 146, 148. The cross-bar 152 of yoke 140 is adhesively secured to a plate 154 which in turn is adhesively secured to a block 156 through which passes a screw 157 which pivotally connects block 156 to a plunger 158 of solenoid 160. Plunger 158 is loosely received in opening 161 in block 156. Solenoid 160 is mounted between standard 162 and a split ring 168 secured in groove 170 in plunger 158 acts to bias plunger 158 downwardly to in turn bias plate 136 downwardly.

A conventional film cartridge 180 (FIG. 7) is rotatably supported by a cartridge holder 182 mounted on frame 4 and supplies film 184 which is wound onto a reel 186. Advantageously, film 184 is a high resolution film such as Kodak 649F of the Eastman Kodak Co. Reel 186 is mounted for rotation on cone 188 mounted on a spring metal tab 190 and a hub 194 which is splined to a spindle 196 driven by motor 200. Film 184 lies between plate 136 and gasket 126. Film 184, gasket 126 and plate 120 form a very shallow developing chamber 210. The chamber 210 will have a depth (i.e., the distance between the emulsion side of film 184 and plate 120) of from about 0.005" to about 0.125", preferably from about 0.005" to about 0.080". Advantageously the depth will be from about 0.015" to about 0.025". The thus formed chamber is circular.

The plate 120 has a supply conduit 214 (FIG. 7) having a reduced small diameter portion 216 in communication with chamber 210 and a discharge conduit 218 having a reduced small diameter portion 220 in communication with chamber 210. The reduced diameter portions 216 and 220 communicate with chamber 210 adjacent the periphery and diametrically opposite to each other. The diameter of these conduits is small to inhibit liquid from flowing out of chamber 210 when no pumps are running. Advantageously they will have a diameter in the range of from about 1/32" to about 7/32" with the portion 216 preferably having a diameter larger than that of portion 220.

Figure 9:
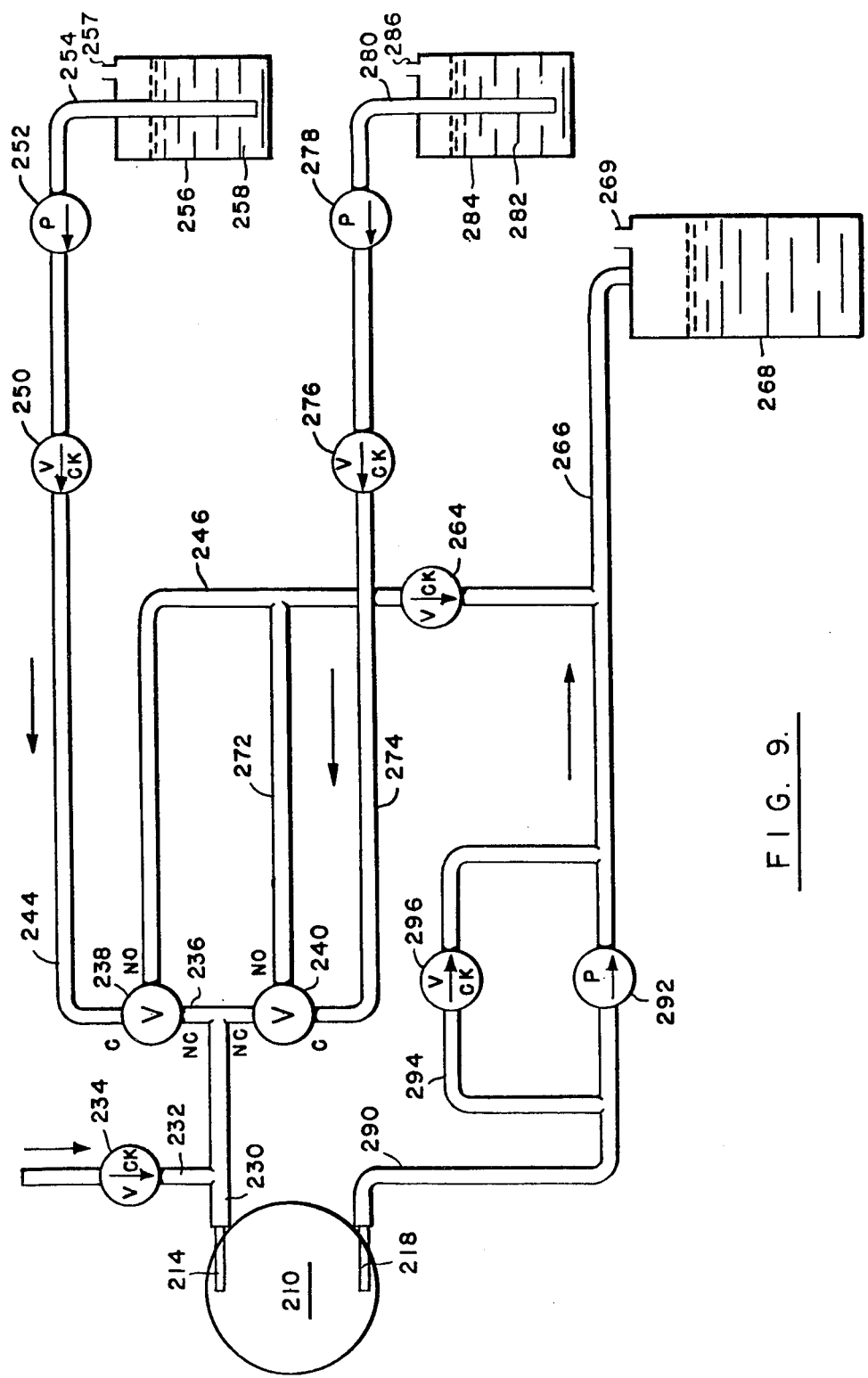
FIG. 9 is a diagrammatic view of the hydraulic system of the device of FIG. 1.

Conduit 214 is connected to a line 230 (FIG. 9) to which is connected a vent line 232 containing a check valve 234 to prevent fluid from passing through the vent line when it is being pumped to chamber 210. Line 230 is connected by line 236 to a valve 238 and a valve 240. Valve 238 is connected to line 244 and line 246. Valve 238 is a two-position valve connecting line 244 to either line 236 or line 246, the normal position being the connection to line 246. Line 244 has a check valve 250 and is connected to a pump 252 which is connected by line 254 to a supply tank 256 having a vent 257 and containing water 258. Line 246 contains a check valve 264 and is connected to a drain line 266 which discharges into a tank 268 having a vent 269. Lines 244 and 266 are long and flexible to permit locating pump 252 and tanks 256 and 268 at a remote location separate from the main portion of apparatus 2.

Valve 240 is connected to line 272 which is connected to line 246; also valve 240 is connected to line 274. Valve 240 is a two-way valve connecting line 274 to either line 272 or line 236 with the connection to line 272 being the normal position. Line 274 contains a check valve 276 and is connected to a pump 278 which in turn is connected to a line 280 which is adapted to pick up a developing-fixing bath (monobath) 282 from a tank 284 which has a vent 286. A typical monobath is Kodak 448 of the Eastman Kodak Co. Line 274 is long and flexible so that pump 278 and tank 284 can be placed at a remote location away from the main part of apparatus 2.

Discharge conduit 218 is connected to line 290 which is connected to pump 292 which discharges into line 266. Pump 292 is, for example, a rubber vane type pump which will not pass fluid when stopped. A line 294 containing check valve 296 is in parallel with pump 292 to bypass pump 292. A quick disconnect fitting 295 (FIG. 2) is provided for lines 244, 266 and 274.

Figure 10:
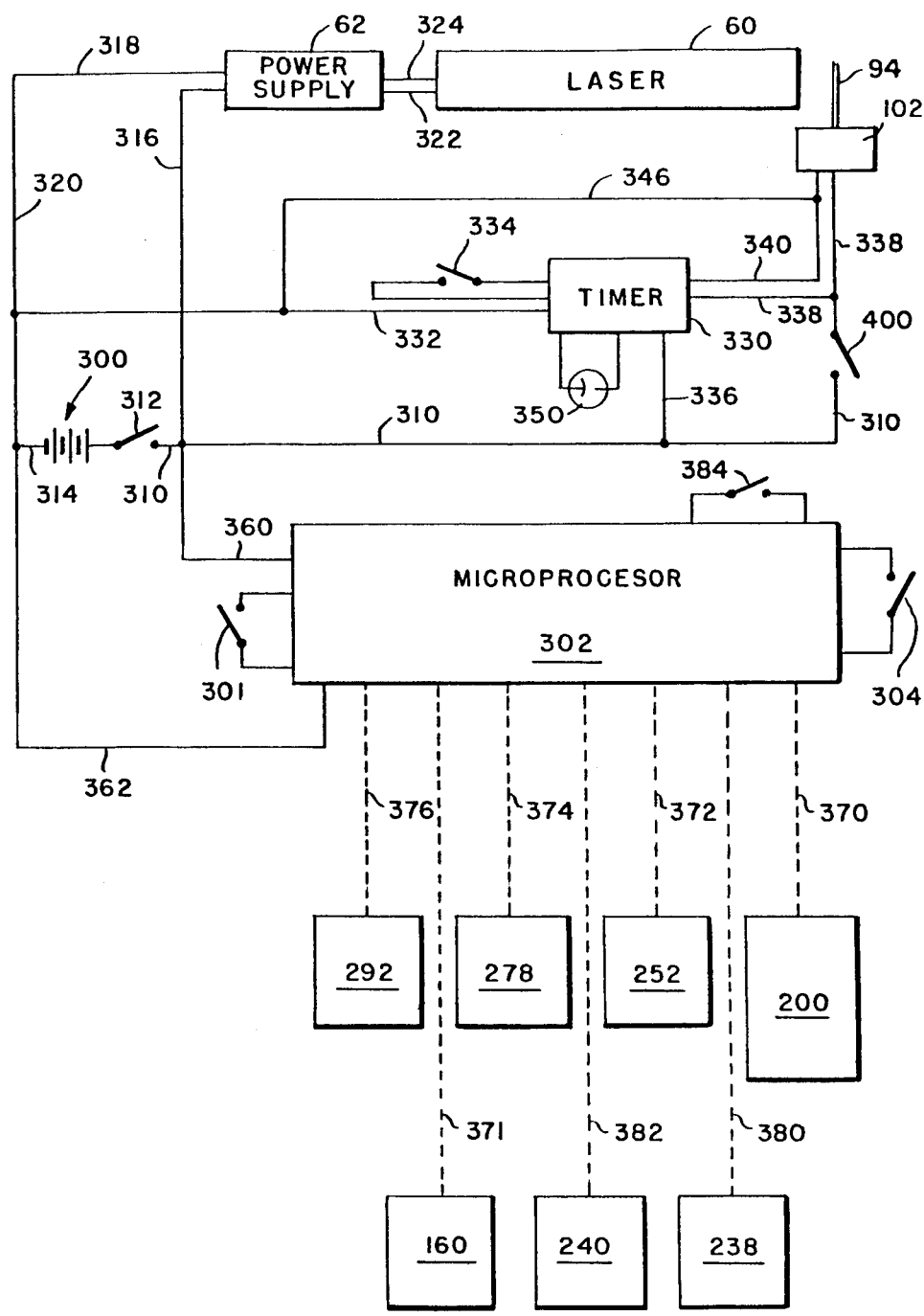
FIG. 10 is a diagrammatic view of the microprocessor and associated elements of the apparatus of FIG. 1.

Referring to FIG. 10, the apparatus 2 is energized by a 12-volt battery indicated at 300 the positive side of which is connected to a line 310 containing a main power switch 312 and the negative side of which is connected to a line 314. Power supply 62 is connected to line 310 by line 316 and is connected to the negative side of battery 300 through lines 318, 320 and 314. Laser 60 is connected to the power supply 62 by lines 322 and 324. A timer switch 330 having a momentary starting switch 334 controls shutter solenoid 102. Timer 330 is connected by line 332 to line 320 and by line 336 to line 310. Timer switch 330 controls shutter solenoid 102 being connected thereto by lines 340 and 338. Solenoid 102 can also be activated by closing switch 400 in line 310 which is connected to line 338, line 340 being connected to line 332 through line 346. Timer 330 is controlled by a photo-electric cell shown at 350.

A microprocessor 302 is programmed to carry out the sequential operations required. The use of microprocessors for sequencing operations is conventional. Other means such as a mechanical stepping switch may be employed. Microprocessor 302 is connected to line 310 by line 360 and line 314 by line 362. As indicated by broken lines 370, 371, 372, 374 and 376 power to motor 200, solenoid 160 and pumps 252, 278 and 292 is respectively controlled by microprocessor 302. Likewise broken lines 380 and 382 indicate the control of power to valves 238 and 240 respectively by microprocessor 302. A quick disconnect fitting 386 (FIG. 2) is provided for connecting the necessary lines to motor 200, solenoid 160, solenoid 102 and power supply 62 to the remaining circuitry.

OPERATIONS

The operation of the apparatus 2 will be evident from the following description. The apparatus 2 is mounted on pipe 12 with the pipe received in arcuate portions 10 of saddles 8 and is secured by straps 26, 26.

For start-up of the apparatus a film cartridge 180 is placed in film holder 182 (FIG. 2) and film 184 is threaded between gasket 126 and plate 136 while solenoid plunger 158 is held upwardly by hand to raise plate 136 above gasket 126. The film is threaded into reel 186 and plunger 158 is released permitting plate 136 to hold the film securely against gasket 126.

Switch 312 is closed to energize laser 60 and provide power to microprocessor 302. Shutter 94 keeps the laser beam from reaching mirror 64.

Momentary switch 301 is closed to initiate the action of microprocessor 302 which then activates pumps 252 and 278 (FIG. 9) for a pre-determined period of time of, for example five seconds causing water to the pumped through lines 254, 244, line 246 and line 266 to waste tank 268. At the same time monobath is pumped through lines 280, 274, 272, 246 and 266 to drain tank 268. The purpose of this operation is to purge air out of the liquid supply system.

Next, momentary switch 304 is closed causing microprocessor 302 to energize solenoid 160 to raise plunger 158 (FIG. 8) and thus pivot frame 140 (FIG. 9) to raise plate 136 and then energizes motor 200 for a period of time sufficient to advance film 184 a distance slightly greater than the inner diameter of gasket 126. As soon as motor 200 is stopped, the microprocessor deenergizes solenoid 160 causing spring 166 to move plunger 158 downwardly to pivot frame 140 to lower plate 136 onto the film and hold it against gasket 126, the pivoting of plate 136 by pins 142 and 144 insuring that plate 136 will be parallel to gasket 126 and press the film uniformly against the gasket.

After the above described operations have been completed, microprocessor 302 activates pump 252 (FIG. 9) and valve 238 causing water to be pumped into developing chamber 210. The circular nature of the chamber and its small depth permitting the surface tension of the liquids employed to provide a capillary type action insuring that even when the apparatus 2 is spatially oriented so that the reduced diameter portion 216 of supply conduit 214 is located at the top of chamber 210, the in flowing liquid forces all of the fluid out of the chamber 210. Thus, in all orientations, the water pumped into chamber 210 through line 244 valve 238 line 236 and line 230 forces out all the air in chamber 210 through conduit 218 and lines 290, 294 and 266 to waste container 268. During this operation pump 292 blocks the flow of fluid therethrough being fluid tight when at rest. When chamber 210 has been filled with water, microprocessor 302 stops pump 252, deenergizes valve 238 and ceases operation for the time being.

Figure 8:
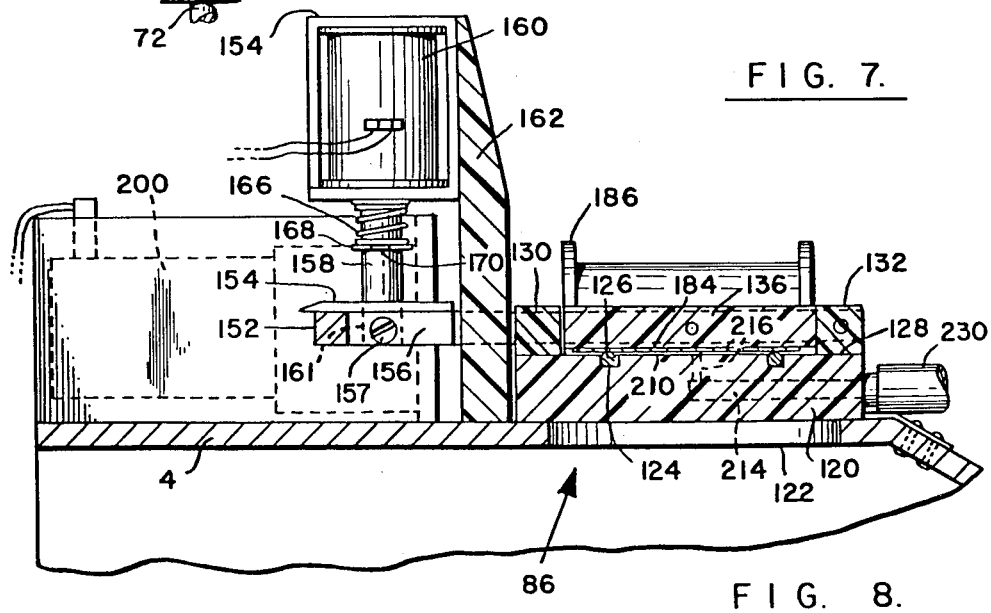
FIG. 8 is a section taken on the plane indicated by the line 8—8 in FIG. 7.

Momentary switch 334 is now closed to activate timer switch 330 which immediately activates shutter solenoid 102 to permit the laser beam to be directed by mirrors 64, 66 and 68 (FIG. 1) onto coupling 82 and thence reflected through opening 122 onto film 184 (FIG. 8). The photo-electric cell 350 measures the intensity of the light being reflected to cause timer 330 to vary the length of time that solenoid 102 energized. After solenoid 102 is deenergized by timer switch 330 causing spring 100 to close shutter 96 and block off the laser beam, coupling 82 is stressed, for example, by pressurizing the piping system in which pipes 12 and 84 are found. Then switch 334 is again used to activate timer switch 330 to again expose film 184.

After the shutter closes, momentary switch 304 is again closed to initiate the developing and fixing of the film. Microprocessor 302 activates pump 278 and valve 240 (FIG. 9) causing monobath 282 to be pumped through lines 280, 274, valve 240 and lines 236 and 230 into developing chamber 210 to displace the water therein which passes through lines 290, 294 and 266 to waste tank 268. The configuration of chamber 210 insures the expelling of all of the water from the chamber. The microprocessor 302 then deactivates pump 278 and valve 240. Normally the developing and fixing time is about three seconds. Having provided sufficient time for developing and fixing of the film, microprocessor 302 again activates pump 252 and valve 238 to wash the monobath from chamber 210 and rinse the film with water. Microprocessor 302 then deactivates pump 252 and valve 238.

The thus produced hologram can be viewed by using handle 78 to rotate mirror 68 counter-clockwise as viewed in FIG. 1 to a position to reflect the laser beam from mirror 68 upwardly through film 184 while activating the shutter solenoid 102 by closing switch 400 which parallels timer 330. At this stage, if desired, a photograph of the hologram may be taken by directing a camera towards plate 136. Instant camera such as are made by Polaroid and Eastman Kodak are convenient for this purpose.

When it is desired to make the next hologram, switch 384 on microprocessor 302 is closed causing microprocessor to activate pump 292 which withdraws all liquid from chamber 210 through conduit 218 and line 290 and discharges it through line 266 into waste container 268. During this operation air is supplied to chamber 210 through check valve 234 and vent line 232 and line 230. The apparatus is now ready to commence a new cycle of operation which is initiated by closing momentary switch 304 to advance film 184, the purging step caused by closing switch 301 only being used once at the initial start up of testing operations and not necessary when repeated tests are being made.

It is evident that the above apparatus can be used for real time holography by simply developing film 184 after one exposure and then viewing the film with the laser beam being reflected from the pipe placed under a condition of stress.

The apparatus described above can be used without any housing to keep out light if it is to be used in a room which can be darkened. Housing 81 is necessary for the exclusion of outside light when the apparatus is to be employed in the field. Housing 81 has a depending portion 396 with an open bottom opposite photographic station 86. When employed, housing 81 is received in a trough 401 secured to frame 4 and secured thereto by screws indicated at 402. A light excluding shroud 404 comprises black side cloths 406 and 408 and end black cloths 410 and 412. Each of the cloths 406 and 408, 410 and 412 has its upper end adhesively secured to depending portion 396 of housing 81. As illustrated in FIG. 14, the side cloths 406 and 408 are wrapped around pipes 12 and 84 and coupling 82 and held together by a strip of adhesive tape indicated at 414. The end cloths 410 and 412 are draped over pipes 84 and 12, respectively and gathered against cloths 406 and 408 to block the entry of light through the ends of the shroud. Such a shroud is conventional as seen from U.S. Pat. No. 1,171,914.

Housing 81 has a light-tight cover 420 pivotally connected to housing 81 at 422 and covering opening 424 which when cover 420 is open permits viewing of the photographic station 86. A handle 428 is attached to housing 81 to facilitate carrying the apparatus.

As discussed above the contour of the periphery of the developing chamber always changes direction at an angle of greater than 125°. This permits numerous different configurations.

Figure 15:
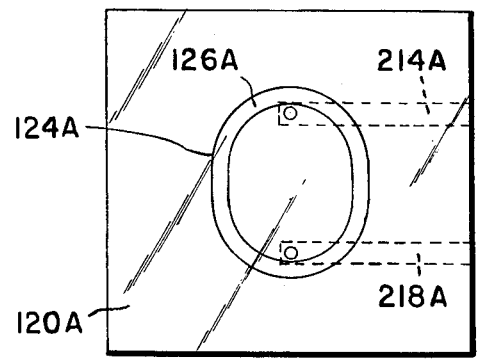
FIG. 15 is a plan view of an alternative transparent plate and gasket.

In FIG. 15 there is an alternative transparent plate 120A which is identical to plate 120 having a supply conduit 214A and a discharge conduit 218A but has an elliptical groove 124A containing a gasket 126A.

Figure 16:
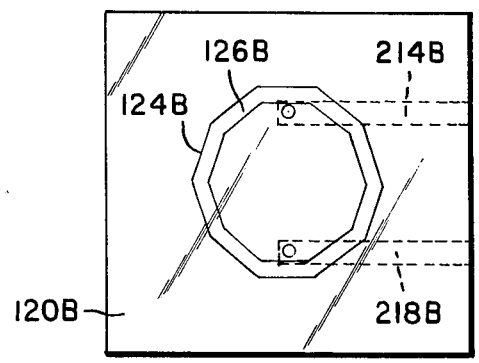
FIG. 16 is a plan view of an alternative transparent plate and gasket.

An alternative transparent plate 120B (FIG. 16) is identical to plate 120 having a supply conduit 214B and a discharge conduit 128B but has a decagonal groove 124B and a gasket 126B therein.

Figure 17:
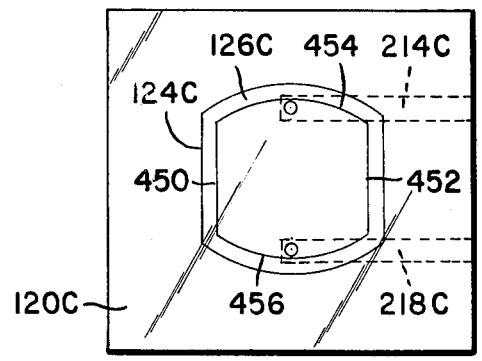
FIG. 17 is a plan view of an alternative transparent plate and gasket.

An alternative transparent plate 120C (FIG. 17) is identical to plate 120 and has a supply conduit 214C and a discharge conduit 218C but has a groove 124C having straight sides 450 and 452 and curved portions 454 and 456. A gasket 126C is in groove 124C.

All of the plates 120A, 120B and 120C with their associated gaskets will form developing chambers with plate 136 having peripheries with suitable contours.

It will be understood that the above described apparatus is illustrative and is not intended to be limiting.

I claim:

1. A photographic station comprising:
a transparent base plate;
a transparent cover plate movable towards and away from the base plate,
means for moving the cover plate towards and away from the base plate,
means for sealing extending from the base plate,
means for advancing a photographic film between the sealing means and the cover plate,
said sealing means forming the periphery of a chamber between said base plate and the photographic film,
means including said base plate and sealing means forming with the photographic film a developing chamber having a depth in the range of from about 0.005" to about 0.125" for spreading a liquid across the entire developing chamber by capillary action to remove any air from the developing chamber when the photographic station is at any spacial orientation, and
a supply conduit and a discharge conduit connected to the chamber at substantially opposite points and adjacent the periphery of the chamber.

2. A photographic station in accordance with claim 1 having means for pumping a liquid through the supply conduit and means connected to the discharge conduit for exhausting liquid from the chamber.

3. A photographic station in accordance with claims 1 or 2 in which the contour of the developing chamber is circular.

4. A photographic station in accordance with claims 1 or 2 in which the contour of the photographic station is elliptical.

5. A photographic station comprising:
a first transparent plate having a circular gasket receiving recess in one face,
a circular gasket in said recess extending from about 0.005" to about 0.125" beyond said face of the plate,
a supply conduit and a discharge conduit for communicating with said face of the first transparent plate at substantially opposite points adjacent and inside of the gasket,
a second transparent plate opposite the first plate adapted to urge a portion of the photographic film against the gasket,
means for raising and lowering the second plate to permit film advance,
means for advancing a photographic film between the gasket and the second plate,
means for pumping liquid through said supply conduit,
means for exhausting the liquid from a chamber formed by said first transparent plate, the gasket and a film pressed against the gasket by the second transparent plate, and means for spreading the liquid across the entire chamber by capillary action to remove any air from the chamber when the photographic station is at any special orientation.

* * * * *